United States Patent [19]

Chen, Sr. et al.

[11] Patent Number: 5,137,985
[45] Date of Patent: Aug. 11, 1992

[54] MISCIBLE BLENDS OF POLYBENZIMIDAZOLES AND POLYAMIDE-IMIDES HAVING FLUORINE-CONTAINING LINKING GROUPS AND PROCESS FOR PREPARATION OF THE BLENDS

[75] Inventors: Paul N. Chen, Sr., Gillette; Morton Glick, Summit; Rohitkumar H. Vora, Westfield; Michael Jaffe, Maplewood, all of N.J.

[73] Assignee: Hoechst Celanese Corp., Somerville, N.J.

[21] Appl. No.: 411,351

[22] Filed: Sep. 22, 1989

[51] Int. Cl.$^5$ .................. C08L 79/06; C08L 79/08
[52] U.S. Cl. .................. 525/431; 525/432; 525/435; 525/436
[58] Field of Search ............... 525/432, 435, 436, 431

[56] References Cited

U.S. PATENT DOCUMENTS 4,954,610 9/1990 Chen, Sr. et al. .................. 528/350
4,973,629 11/1990 Williams et al. .................. 525/432

Primary Examiner—Ana L. Carrillo
Attorney, Agent, or Firm—Joseph M. Mazarese

[57] ABSTRACT

A miscible blend comprising from about 5 to about 95 weight percent of a polybenzimidazole and from about 95 to about 5 weight percent of a polyamide-imide having fluorine-containing linking groups, total weight percent of the two polymers being 100. A process for preparing the blends comprises dissolving in a mutual solvent from about 5 to about 95 weight percent of the aromatic polybenzimidazole to about 95 to about 5 weight percent of the polyamide-imide having fluorine-containing linking groups, based on the total weight of those polymers and subsequently evaporating the solvent, thereby producing a dried blend of a polybenzimidazole and a polyamide-imide having fluorine-containing linking groups. The blends, particularly in the form of films, fibers or fibrets, may be post-treated with heat or sulfuric acid in order to minimize their shrinkage when subsequently subjected to heat and in order to increase their resistance to solvents and acid. The polyamide-imides having fluorine-containing linking groups are prepared by forming the polycondensation product of one or more aromatic diamines, one or more trifunctional acid anhydride monomers, and one or more tetrafunctional aromatic dianhydrides, at least one of said monomers containing the group

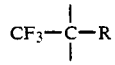

linking two aromatic moieties, wherein R is $CF_3$ or phenyl.

23 Claims, 5 Drawing Sheets

Fig. 4: Thermal Oxidative Stability Study of PBI/10% 6F-PAI Film Blends

FIG. 5: DMTA Analysis of 50/50 PBI/10% 6F-PAI* Film

MISCIBLE BLENDS OF POLYBENZIMIDAZOLES AND POLYAMIDE-IMIDES HAVING FLUORINE-CONTAINING LINKING GROUPS AND PROCESS FOR PREPARATION OF THE BLENDS

The present invention relates to novel blends of polybenzimidazoles and aromatic polyamide-imide polymers having fluorine-containing linking groups, particularly those containing the hexafluoroisopropylidene or the 1-phenyl-2,2,2-fluoroethane linking group. The blends have improved physical and chemical properties. The invention also relates to a method for preparing such blends and to shaped articles prepared therefrom such as fibers, films and compression molded articles.

BACKGROUND OF THE INVENTION

Aromatic polybenzimidazoles are characterized by a high degree of thermal and chemical stability. They may be shaped to form fibers, films, and other articles of wide utility which show resistance to degradation by heat, hydrolytic media and oxidizing media. However, many of the polybenzimidazoles are not easily thermally processable at desirably low enough temperatures and pressures. Unfortunately, the aromatic polybenzimidazoles have relatively high moisture regain, which, although desirable for textile fibers, is undesirable for engineering plastics. In addition, they are rather expensive polymers.

Processes for the preparation of aromatic polybenzimidazoles are described in a number of U.S. patents, e.g., U.S. Pat. Nos. 3,901,855; 4,002,679; 3,433,772; 3,441,640; 3,509,108; 3,526,693; 3,549,603; 3,552,389; 3,619,453; 3,671,491; 3,969,430; and 4,020,142. In addition, a review of the processes for the preparation of aromatic polybenzimidazoles is contained in J. P. Critchley, G. J. Knight and W. W. Wright, *Heat-Resistant Polymers—Technologically Useful Materials*, Plenum Press, New York (1983), 259–322.

Polyamide-imide polymers and copolymers are known in the art. These materials are generally prepared by the condensation polymerization of trifunctional acid monomers such as the 4-acid chloride of trimellitic anhydride and one or more aromatic diamines. Examples of such polyamide-imide polymers are disclosed in U.S. Pat. Nos. 3,347,828, 3,494,890, 3,661,832, and 3,920,612. These polymers may be characterized as having extremely good high temperature properties (Tg of about 275° C. or higher), good high temperature stability, good tensile strength at high temperatures, good mechanical properties and good chemical resistance. These polyamide-imides are useful as wire enamel coatings, laminates, molded products, films, fibers, impregnating varnishes and in other applications where high thermal stability is required.

One of the problems associated with such polymers is that they exhibit generally poor flow properties, which render them difficult to process, particularly to injection mold or to spin into fibers. These polymers are also relatively hydrophilic and tend to absorb moisture which can affect their clarity, heat stability, processability, and mechanical and electrical properties.

Attempts have been made in the art to improve the flow properties of polyamide-imide polymers. For example, U.S. Pat. No. 4,448,925 discloses including from about 1 to about 10 percent phthalic anhydride into the polymerization recipe to provide polyamide-imide copolymers having improved flow properties. However, this technique for improving flow properties is made at the expense of the heat stability and chemical resistance of the polymer. Yet another method for improving the flow properties of such polymers is to form blends thereof with up to about 10% by weight of a polyamide such as Nylon 6 or Nylon 66, as disclosed in U.S. Pat. No. 4,575,924. Once again however, such an approach to solving the flow problem is made at the expense of the thermal stability and optical clarity of the resultant polymer blend.

The novel polyamide-imides having fluorine-containing linking groups which are used in the blends of this invention are described in detail in commonly assigned U.S. patent application Ser. Nos. 07/316,220, U.S. Pat. No. 4,923,960, "Polyamide-Imide Polymers Having Fluorine-Containing Linking Groups" (Paul N. Chen, Sr. and Rohitkumar H. Vora); U.S. Ser. No. 07/316,254, U.S. Pat. No. 4,963,647, "Polyamide-Imide Polymers Having 12-F Fluorine Linking Groups" (Rohitkumar H. Vora, Paul N. Chen, Sr. and Jeffrey S. Devolve); and U.S. Ser. No. 07/316,380, U.S. Pat. No. 4,954,610, "Polyamide-Imide Polymers Having Fluorine-Containing Linking Groups" (Paul N. Chen, Sr. and Rohitkumar H. Vora), all of which were filed on Feb. 27, 1989; as well as commonly assigned U.S. patent application Ser. No. 07/348,634, U.S. Pat. No. 4,962,183, "Polyimide-Polyamide Polymers Having Fluorine-Containing Linking Groups" (Paul N. Chen, Sr. and Rohitkumar H. Vora), filed May 5, 1989.

In addition to improved flow properties, the polyamide-imides having fluorine-containing linking groups used in the blends of this invention also exhibit improved solubility properties in most organic solvents, improved resistance to attack by chlorinated solvents such as trichloroethylene as compared with polyimides, improved hydrophobic properties as well as excellent thermal properties including resistance to thermooxidative degradation.

PRIOR ART

Unduly broad but unenabling suggestions about blending polymers exist in the literature. However, most pairs of polymers tend to be totally immiscible [Fred W. Billmeyer, Jr., *Textbook of Polymer Science*, Wiley-Interscience, New York (1984), 176]. The surprisingly miscible compositions of polyimides or polyetherimides and aromatic polybenzimidazoles are the subject of commonly assigned European Patent Publication No. 0 242 949, published Oct. 28, 1987.

SUMMARY OF THE INVENTION

The present invention provides blends of an aromatic polybenzimidazole and a novel heat stable polyamide-imide having fluorine-containing linking groups, which blends have excellent properties that render them more readily processable into fibers, films, sheets and other shaped articles. The polyamide-imides having fluorine-containing linking groups are prepared by forming the polycondensation product of one or more aromatic diamines, one or more trifunctional acid anhydride monomers, and one or more tetrafunctional aromatic dianhydrides, at least one of said monomers containing the groups linking two aromatic moieties, wherein R is CF$_3$ or phenyl.

The polybenzimidazoles and polyamide-imide having fluorine-containing linking groups are compatible with each other in all proportions.

Generally, the invention comprises a miscible blend comprising from about 5 to about 95 weight percent of a polybenzimidazole and from about 95 to about 5 weight percent of a polyamide-imide having fluorine-containing linking groups, total weight percent of the two component polymers in the blend being 100.

The blends of the invention may be formed into films, fibers, fibrets or shaped articles. Articles may be compression molded from a molding composition which includes, as one component, the blend of the present invention. Such a molding composition may also incorporate into the polymer matrix approximately 1 to less than 50 percent, preferably approximately 10 to 30 percent, by weight, based upon the total weight of the molding composition, of a solid filler, reinforcing agent, and/or an impact modifier. Representative fibers which may serve as reinforcing media include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, etc. Representative filler materials include calcium silicate, silica, clays, talc, mica, polytetrafluoroethylene, graphite, alumina trihydrate, sodium aluminum carbonate, barium ferrite, etc.

The blends of the invention, particularly in the form of films, fibers or fibrets, may be post-treated with heat or sulfuric acid in order to minimize their shrinkage when subsequently subjected to heat and in order to increase their stabilities to solvents and acid.

The novel blends of this invention have unexpected properties and benefits. Articles made from the blends are useful under environmental conditions where their improved physical properties are required. Compared to polybenzimidazoles and to polyamide-imides having fluorine-containing linking groups, the blends have improved tensile and Young's modulus values.

Therefore, it is an object of this invention to provide blends of an aromatic polybenzimidazole and a polyamide-imide having fluorine-containing linking groups, which blends have improved physical properties compared to their component polymers or to their blends as would be predicted by the rule of mixtures. Consequently, the blends have better price/performance characteristics.

It is a further object of this invention to provide blends, especially in film form, of a polybenzimidazole and a polyamide-imide having fluorine-containing linking groups that have lower moisture sensitivity and dielectric constant and higher mechanical properties and thermal oxidative stability than either polymer alone or than the rule of mixtures would predict for a blend of the component polymers.

It is a still further object of this invention to provide blends of polybenzimidazoles and polyamide-imides having fluorine-containing linking groups which are useful in applications where the polybenzimidazoles or polyamide-imide having fluorine-containing linking groups themselves are either not useful or not as useful.

DESCRIPTION OF THE PREFERRED EMBODIMENTS

Although any aromatic polybenzimidazole described in the prior art may be used, the preferred aromatic polybenzimidazoles employed as starting materials to prepare the novel polymer blends of the present invention are those having the repeating unit formula:

wherein represents a tetravalent aromatic moiety having the formula:

wherein $R^1$ is —O—, —SO$_2$—, —CH=CH—, —C(CF$_3$)$_2$— or (—CH$_2$—)$_x$ and x is an integer of from 1 to 4; and —Ar$^2$— represents a divalent aromatic moiety having the formula:

wherein $R^2$ is —O—, —SO$_2$—, —CH=CH—, —C(CF$_3$)$_2$— or (—CH$_2$—)$_x$ and x is an integer of from 1 to 4.

Examples of the more preferred aromatic polybenzimidazoles which may be used in the polymer blends of the present invention include:

poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene 4",4"')-5,5'-bibenzimidazole;
poly-2,6'-(m-phenylene)-diimidazobenzene;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone,
poly-2,2'-(m-phenylene)-5,5'-di(benzimidazole)-methane;
poly-2,2'-(m-phenylene)-5,5'-di(benzimidazole)-hexafluoroisopropane;
poly-2,2'-(m-phenylene)-5,5" di(benzimidazole)-propane-2,2; and
poly-2,2"'-(m-phenylene)-5,5" di(benzimidazole)-ethylene-1,2 where the double bonds of the ethylene groups are intact in the final polymer.

Poly-2,2'-(m-phenylene)-5,5'-bibenzimidazole, which contains recurring units of the formula:

is most preferred. Aromatic polybenzimidazoles of this type are commercially available from Hoechst Celanese Corporation. These polybenzimidazoles are preferred components of the polymer blends because they are relatively more thermally stable and more soluble in N,N-dimethylacetamide than other polybenzimidazoles. This solubility makes them relatively processable.

The polyamide-imide polymers useful in the blends of the present invention are the subject of copending U.S. patent application Ser. Nos. 07/316,220 (Paul N. Chen, Sr. and Rohitkumar H. Vora); U.S. Ser. No. 07/316,254 (Rohitkumar H. Vora, Paul N. Chen, Sr. and Jeffrey S. Devolve); and U.S. Ser. No. 07/316,380 (Paul N. Chen, Sr. and Rohitkumar H. Vora), all filed Feb. 27, 1989; and U.S. Ser. No. 07/348,634 (Paul N. Chen, Sr. and Rohitkumar H. Vora), filed May 8, 1989, which are incorporated herein by reference.

One class of the polyamide-imide polymers having fluorine-containing linking groups that may be used in the blends of the present invention are those of U.S. patent application Ser. No. 07/316,220. They may be characterized as having structural units of the formula:

wherein $Ar^3$ is a divalent aromatic moiety; $Ar^4$ is a tetravalent aromatic moiety of the residuum formula:

and a and b, each having an independent value of from about 0.05 to about 0.95, are equal to the mole fraction of each recurring unit in the polymer chain, with the proviso that the sum of a and b is equal to 1.00, n is a number sufficient to give rise to a polyamide-imide inherent viscosity of at least about 0.1 as measured at 25° C. from a 0.5 weight percent solution of the polymer in dimethyl acetamide.

Another class of the polyamide-imide polymers having fluorine-containing linking groups that may be used in the blends of the present invention are those of U.S. patent applications Ser. Nos. 07/316,380 and 07/316,254. They may be characterized as having structural units of the formula:

wherein Ar³ is a divalent aromatic moiety; Ar⁵ is a divalent aromatic moiety containing the ring substituted or ring unsubstituted residuum selected from:

wherein R is $CF_3$ or phenyl and a, having a value of from about 0.00 to about 0.95, and b, having a value of from about 1.00 to about 0.05, represent the mole fraction of each recurring unit in the polymer chain, with the proviso that the sum of a and b is equal to 1.00, and n is a number sufficient to give rise to an inherent viscosity of at least about 0.1 for the polyamide-imide having fluorine-containing linking groups as measured at 25° C. from a 0.5 weight percent solution of that polymer in dimethyl acetamide.

Still another class of the polyamide-imide polymers having fluorine-containing linking groups that may be used in the blends of the present invention are those of U.S. patent application Ser. No. 07/348,634. They may be characterized as having structural units of the formula:

wherein R is $CF_3$ or phenyl and wherein Ar³ is a divalent aromatic moiety; Ar⁴ is a tetravalent aromatic moiety containing the ring substituted or ring unsubstituted residuum selected from:

and a and b, each having an independent value of from about 0.05 to about 0.95, represent the mole fraction of each recurring unit in the polymer chain, with the proviso that the sum of a and b is equal to 1.00, and n is a number sufficient to give rise to an inherent viscosity of at least about 0.1 for the polyamide-imide having fluorine-containing linking groups as measured at 25° C. from a 0.5 weight percent solution of that polymer in dimethyl acetamide.

In the polyamide-imides of formulas 3, 6 and 11, $Ar^3$ may be the divalent residuum of one or a combination of aromatic diamines having the formula:

(12)

wherein $R^3$ is the aromatic moiety of a phenylene, naphthalene, bis or polyphenylene type compound. $R^3$ is preferably selected from:

, and

, wherein $R^4$ is a divalent moiety independently selected from a covalent carbon to carbon bond, methylene, ethylene, propylene, isopropylene, hexafluoroisopropylidene, 1-phenyl-2,2,2-trifluoroethylidene, dichloro and difluoroalkylenes up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene having up to 8 Si atoms, disiloxanylene, and a polysiloxanylene having up to 8 Si atoms. Preferably, the linking group $R^4$ is selected from oxy, hexafluoroisopropylidene, 1-phenyl-2,2,2-trifluoroethylidene, carbonyl, methylene, a covalent carbon to carbon bond, disiloxanylene and polysiloxanylenes. Most preferably, $R^4$ is a carbon to carbon bond, or methylene, hexafluoroisopropylidene, 1-phenyl-2,2,2-trifluoroethylidene or oxy group.

With respect to polyamide-imides of formulas 3 and 11, $Ar^4$ may be the tetravalent residuum of either 2,2-bis(3,4-dicarboxyphenyl) hexafluoropropane dianhydride, 1,3-bis(3,4-dicarboxyphenyl) hexafluoropropane dianhydride, 2,2-bis[4-(3,4-dicarboxyphenoxy)phenyl] hexafluoropropane dianhydride, 1,1-bis(3,4-dicarboxyphenyl)-1-phenyl-2,2,2-trifluoroethane dianhydride, 1,1-bis[4-(3,4-dicarboxyphenyl)phenyl]-1-phenyl-2,2,2-trifluoroethane dianhydride, and

4,4-bis[2-(3,4-dicarboxyphenyl) hexafluoroisopropyl] diphenyl ether dianhydride.

The hydrogen atoms of the aromatic groups $Ar^3$ and/or $Ar^4$ may be substituted by one or more non-interfering monovalent substituents such as chloro, fluoro, lower alkyl or alkoxy having up to 6 carbon atoms, and phenyl. Also, the term "aromatic" as used herein is meant to include heteroaromatics wherein one or more of the ring atoms is replaced with —O—, —S— or —N— atoms.

Divalent diamine monomers which may be used in preparing the polyamide-imides having fluorine-containing linking groups include:
m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl) sulfone;
bis(4-aminophenyl) sulfone;
4,4'-diamino-dibenzyl sulfoxide;
bis(4-aminophenyl) ether;
bis(3-aminophenyl) ether;
bis(4-aminophenyl) diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;

3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2-(3-aminophenyl)-2-(4-aminophenyl) hexafluoropropane;
2,2-bis[4-(4-aminophenoxy)phenyl] hexafluoropropane;
2,2-bis[4-(2-chloro-4-aminophenoxy)phenyl] hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,3-bis(3-aminophenyl) hexafluoropropane;
1,5-bis(3-aminophenyl) decafluoropentane; and mixtures thereof.

In the preferred embodiments of the present invention, polyamide-imides of formula 3 above are prepared by forming the polymer condensation product of a mixture of a mono-acid anhydride such as 4-trimellitoyl anhydride chloride (4-TMAC) having the structure:

(13)

and 2,2-bis(3,4 dicarboxyphenyl) hexafluoropropane dianhydride (6F-Dianhydride) having the structure:

(14)

with one or more aromatic diamines of the structure of formula 12 above.

Polyamide-imides of formula 3, 6 and 11 above may also be prepared from an aromatic diamine monomer containing fluorine-containing linking groups or from a mixture of such diamine monomers and non-fluorine containing aromatic diamines.

The polyamide-imide polymers used in the blends of this invention may be based 100 mole % on fluorine-containing monomers as in the case of polymers of formula 3 wherein both the $Ar^3$ and $Ar^4$ moieties are based on fluorine-containing residua of formulas 4 and formula 5. More preferably, however, the polymers contain from about 1 to about 100 mole percent of fluorine containing monomers and more particularly from about 2 to about 50 mole percent of fluorine containing monomers, based on the total weight of acid/anhydride or dianhydride and amino monomers present in the polymer.

A preferred polyamide-imide used in the blends of the invention is represented by the following unit formula:

wherein $a$ and $b$ are as described above. Particularly preferred are those polyamide-imides wherein $a$ has a value from about 0.5 to about 0.9 and $b$ has a value from about 0.5 to about 0.1. Especially preferred are those polyamide-imides wherein $b$ has a value of from about 0.1 to about 0.2 and $a$ has a corresponding value of from about 0.9 to about 0.8.

The polyamide-imides having fluorine-containing linking groups are preferably prepared by a solution polymerization process, i.e., by reacting the acid anhydride, dianhydride and diamine monomers in an appropriate solvent, optionally in the presence of a catalyst or an added inorganic salt such as lithium chloride or calcium chloride, and in a nitrogen atmosphere. Polymerization is conducted under anhydrous, isothermal polymerization conditions and preferably at a temperature of less than 35° C. The intermediate polyamide-polyamic acid reaction product is then cyclized to form the polyamide-imide either by chemical dehydration or by an appropriate heat treatment. The polymer may be recovered by precipitation in water or an alcohol such as methanol, and washed.

The acid/anhydride, dianhydride and diamine reactants, particularly those containing fluorine, are preferably substantially electronically pure and are referred to as electronic grade monomers. They generally should be at least about 98.5% pure, and more preferably at least about 99.5% pure.

The solvents useful in the solution polymerization process for synthesizing the polyamide-imides having fluorine-containing linking groups are the organic solvents whose functional groups do not react with the reactants to any appreciable extent. In addition to being inert to the system and, preferably, being a solvent for the polyamide-imides having fluorine-containing linking groups, the organic solvent must be a solvent for at least one of the reactants, preferably for all of the reactants. The normally liquid organic solvents of the N,N-dialkylcarboxylamide class are useful as solvents in the process. The preferred solvents are the lower molecular weight members of this class, particularly N,N-dimethylformamide and N,N-dimethylacetamide. Other useful solvents are N,N-diethylformamide, N,N-diethylacetamide, N,N-dimethylmethoxyacetamide, N-methyl caprolactam, and the like. Other solvents which may be used include dimethylsulfoxide, N-methyl-2-pyrrolidone, tetramethyl urea, pyridine, dimethylsulfone, hexamethylphosphoramide, tetramethylene sulfone, formamide, N-methylformamide, butyrolactone and phenols such as m-cresol. The solvents can be used alone or in combinations.

To obtain the maximum inherent viscosity, i.e., maximum degree of polymerization, for any particular combination of monomers, solvent, etc., and thus produce shaped articles such as films and filaments of optimum toughness, it has been found that the temperature throughout the reaction should be maintained below 50° C., preferably below about 35° C.

The degree of polymerization of the polyamide-imides is controllable. The use of equimolar amounts of the reactants under the prescribed conditions provides polyamide-imides having fluorine-containing linking groups of very high molecular weight. The use of either reactant in large excess limits the extent of polymerization. In addition to using an excess of one reactant to limit the molecular weight of the polyamide-imides having fluorine-containing linking groups, a chain terminating agent such as phthalic anhydride may be used to "cap" the ends of the polymer chains. Typical useful capping agents are monoanhydrides or monoamines such as phthalic anhydride, aniline or p-methylaniline.

In the preparation of the polyamide-imides having fluorine-containing linking groups, it is desirable that their molecular weight be such that the inherent viscosity of the polymer is at least about 0.1, more preferably from about 0.2 to about 1.0. The inherent viscosity is measured at 25° C. at a concentration of 0.5% by weight of the polymer in a suitable solvent such as dimethylacetamide.

The quantity of organic solvent used in the process need only be sufficient to dissolve enough of one reactant, preferably the diamine, to initiate the reaction of the diamine and the other monomers. It has been found that the most successful results are obtained when the solvent represents at least 60% of the final solution, that is, the solution should contain about 0.05–40% of the polymeric component, more preferably about 15 to 25%.

The second step of the process (dehydration) is performed by treating the polyamide-polyamic acid with a dehydrating agent such as acetic anhydride alone or in combination with a tertiary amine such as acetic anhydride-pyridine mixture. The ratio of acetic anhydride to pyridine can vary from just above zero to infinite mixtures.

Tertiary amines having approximately the same activity as the preferred pyridine can be used in the process. These include isoquinoline, 3,4-lutidine, 3,5-lutidine, 4-methyl pyridine, 3-methyl pyridine, 4-isopropyl pyridine, N,N-dimethyl benzyl amine, 4-benzyl pyridine, and N,N-dimethyl dodecyl amine. The amines and the anhydride converting agent are generally used in ratios ranging from about 0.3 to 1 of the former to 1 of the latter. Trimethyl amine and triethylene diamines are much more reactive, and therefore are generally used in still smaller amounts. On the other hand, the following operable amines are less reactive than pyridine: 2-ethylpyridine, 2-methyl pyridine, triethyl amine, N-ethyl morpholine, N-methyl morpholine, diethyl cyclohexylamine, N,N-dimethyl cyclohexylamine, 4-benzoyl pyridine, 2,4-lutidine, 2,6-lutidine and 2,4,6-collidine, and are generally used in larger amounts.

An alternative method for the preparation of the polyamide-imides having fluorine-containing linking groups is the thermal dehydration of the intermediate polyamide-polyamic acid. This transformation is generally performed in bulk, preferably in the form of a shaped article, e.g., film or filament of the polyamic acid. The dehydration is conducted stepwise starting at temperatures of about 100° C. and increasing the temperature progressively to about 300° C. or even higher, depending on the particular case, towards the end of the imidization step. The reaction is preferably performed under an inert atmosphere, and atmospheric or reduced pressures can be employed.

The polyamide-imides having fluorine-containing linking groups generally have a weight average molecular weight ($M_w$) within the range of from about 5,000 to about 200,000 or more.

It is preferred that the amount of polybenzimidazole in the blend be sufficient to make the polyamide-imide having fluorine-containing linking groups more thermally stable with greater tensile, modulus and impact strength. For example, there is reduced weight loss in the blend when it is subjected to heat for a period of time which would ordinarily result in the greater weight loss of a similar object made from the polyamide-imide having fluorine-containing linking groups itself. More preferably, such blends are comprised of from about 10 weight percent to about 90 weight percent of a polyamide-imide having fluorine-containing linking groups and from about 90 weight percent to about 10 weight percent of a polybenzimidazole. Most preferably, such blends comprise at least about 20 weight percent of a polybenzimidazole. It is surprising that a minor amount of the polybenzimidazole can ameliorate the weak properties of the polyamide-imide having fluorine-containing linking groups, e.g., lower Tg and mechanical properties. Aromatic polybenzimidazole in the blend substantially improves the mechanical properties and thermal stability of the blend, giving excellent price-performance results.

It is preferred that the amount of a polyamide-imide having fluorine-containing linking groups in the blend be sufficient to render the polybenzimidazole less sensitive to moisture. Preferably, the polyamide-imide having fluorine-containing linking groups is present in an amount sufficient to result in such a blend with greatly reduced hydrophilicity and moisture sensitivity. In addition to improving moisture resistance, greater amounts of a polyamide-imide having fluorine-containing linking groups in the blend substantially increase the thermooxidative stability of the polybenzimidazole as well as reduce the cost of the blend substantially below the cost of the polybenzimidazole.

The more preferred blends are those which contain from about 25% to about 75% of each kind of polymer. Those blends have the best price/performance characteristics. Experimental evidence indicates that there are synergistic properties in blends that contain percents of the polybenzimidazole within that range.

Other additives may be included in the blends of the present invention. These additives include plasticizers, pigments; flame retardant additives; reinforcing agents, such as glass fibers; stabilizers; processing aids; and impact modifiers.

The blend compositions of this invention may be prepared by any conventional mixing methods.

For example, a preferred method comprises first dissolving the aromatic polybenzimidazoles and polyamide-imides having fluorine-containing linking groups in a mutual solvent, e.g., N,N-dimethylformamide (DMF), N,N-dimethylacetamide (DMAc), dimethylsulfoxide (DMSO), or N-methylpyrrolidinone (NMP), so that each polymer is present in the resulting solution at the desired concentration up to a total polymer concentration of, e.g., from about 1% to about 25% on a weight/volume basis, preferably from about 15 to 20%. The preferred solvents are DMAc and NMP. It is preferred that the total concentration of the two polymers in the solution be such that the viscosity of the solution is acceptable for subsequent film casting and fiber spinning. The two polymers may be simultaneously dissolved in the solvent, or each polymer may be separately dissolved in separate volumes of solvent, and desired portions of the resulting solutions can be mixed together to form a solution of the two polymers.

The polyamide-imide having fluorine-containing linking groups may be prepared as indicated above and then either at the polyamic acid stage or after imidization, the polybenzimidazole may be added to the solution in order to form the blend of the invention.

The two components of the blend compositions are miscible, or compatible. Several criteria indicate blend compatibility or miscibility. They are:

a) Clearness of a film of the two component polymers (by visual inspection aided by microscopic examination, if necessary);

b) Thermal Analysis indicating that the blend exhibits a single glass transition temperature or shifted signals toward the middle of the two individual Tgs associated with each component;

c) The existence of synergistic effects on properties, i.e., better than the values predicted by the rule of mixture.

It has been noticed that a polyamide-imide containing 10% or 25% of units containing hexafluoroisopropylidene linkages formed visually homogeneous DMAc solutions with PBI at all ratios. These solutions blends were stable at room temperature for at least 24 hours.

In order to further assess the properties of the blends, films of the blends of 6F-PAI (a polyamide-imide having units containing hexafluoroisopropylidene linkages) and PBI were prepared by first casting the solutions of the blends on a glass plate and subsequently drying the cast films in a vacuum oven set at 140° C. for 20 minutes. Transparent films of the blends with compositions across the whole range were obtained from the 10% 6F-PAI (i.e., a polyamide-imide containing 10% of units containing hexafluoroisopropylidene linkages) and PBI. However, the films of the blends made from 25% 6F-PAI and PBI were slightly hazy and somewhat brittle. These results suggested the compatibility between 10% 6F-PAI and PBI might be higher than the corresponding compatibility between 25% 6F-PAI and PBI. It has also been observed that when a polyamide-imide having fluorine-containing linkages is made from methylene diamine, it blends better with PBI than when oxydianiline (ODA) is used instead.

Figure 1:
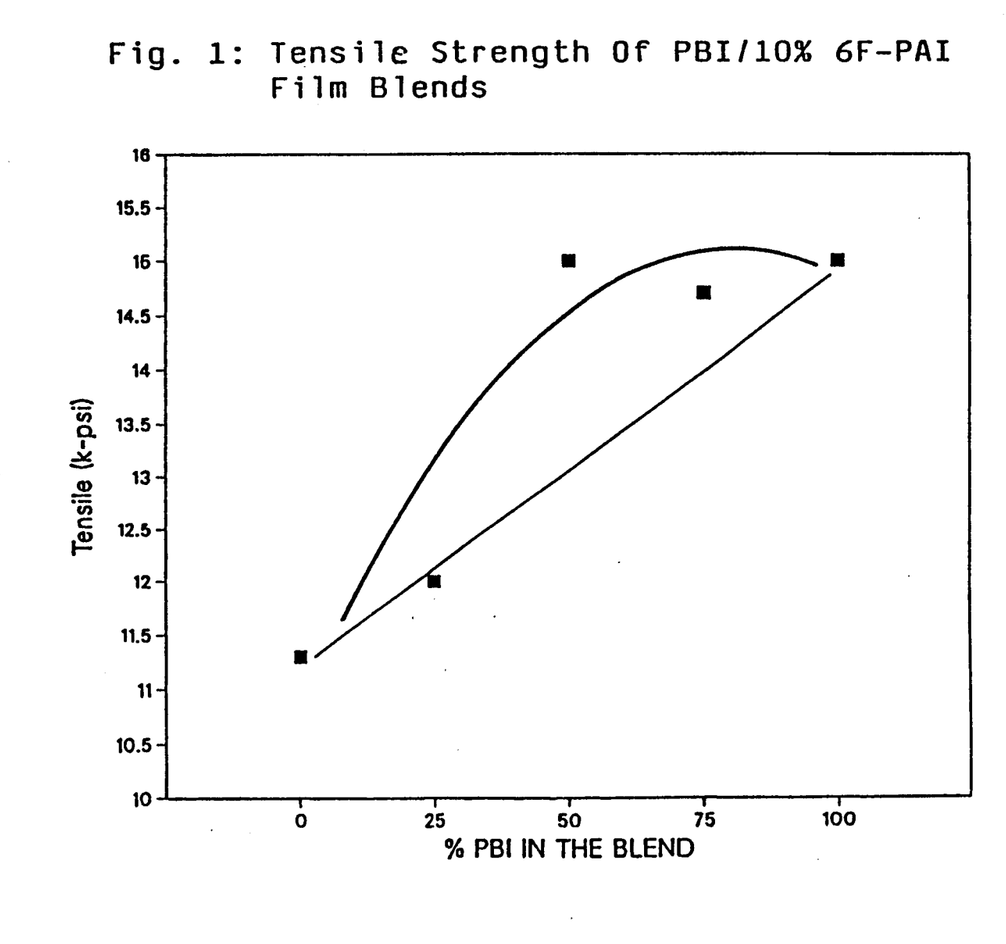
FIG. 1 shows the curve for the tensile values of blends of a polybenzimidazole and a polyamide-imide having fluorine-containing linking groups as well as the polymers themselves. The curve evidences the unexpected improvement of the tensile strength of the blend compared to what would have been predicted by the rule of mixtures.
Figure 2:
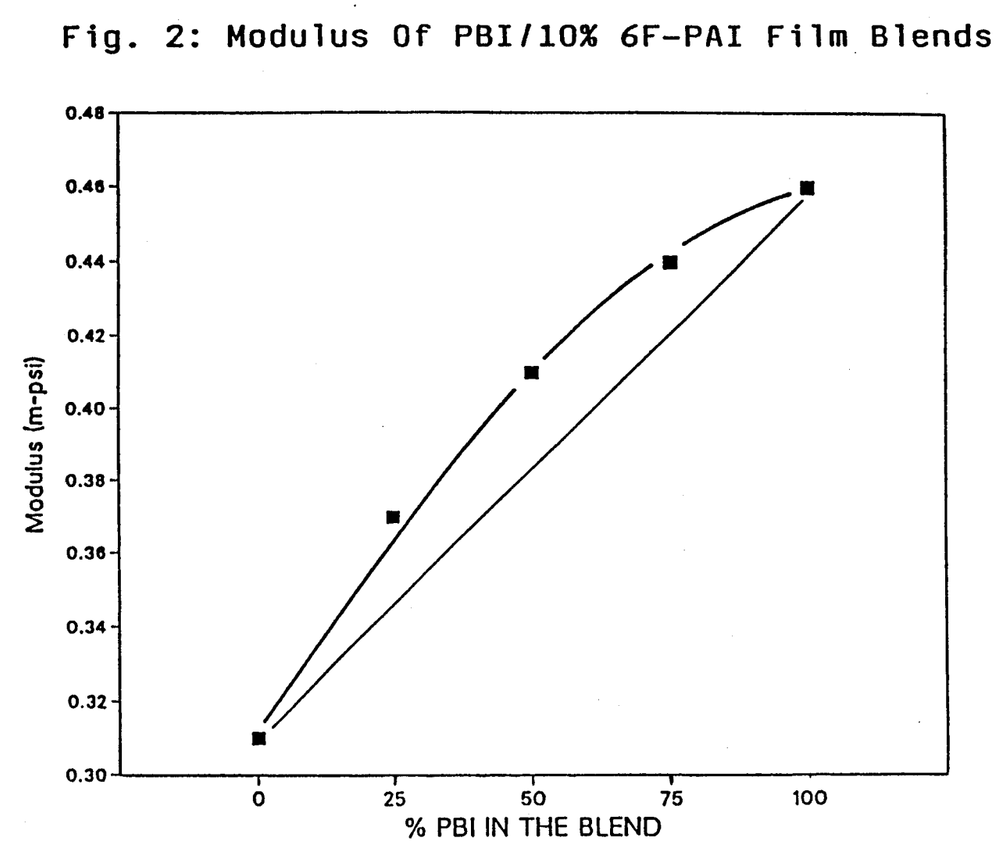
FIG. 2 shows the curve for the Young's modulus values of films of blends of a polybenzimidazole and a polyamide-imide having fluorine-containing linking groups as well as the polymers themselves. The curve evidences the unexpected improvement of the Young's Modulus of the film of the blend compared to what would have been predicted by the rule of mixtures.
Figure 3:
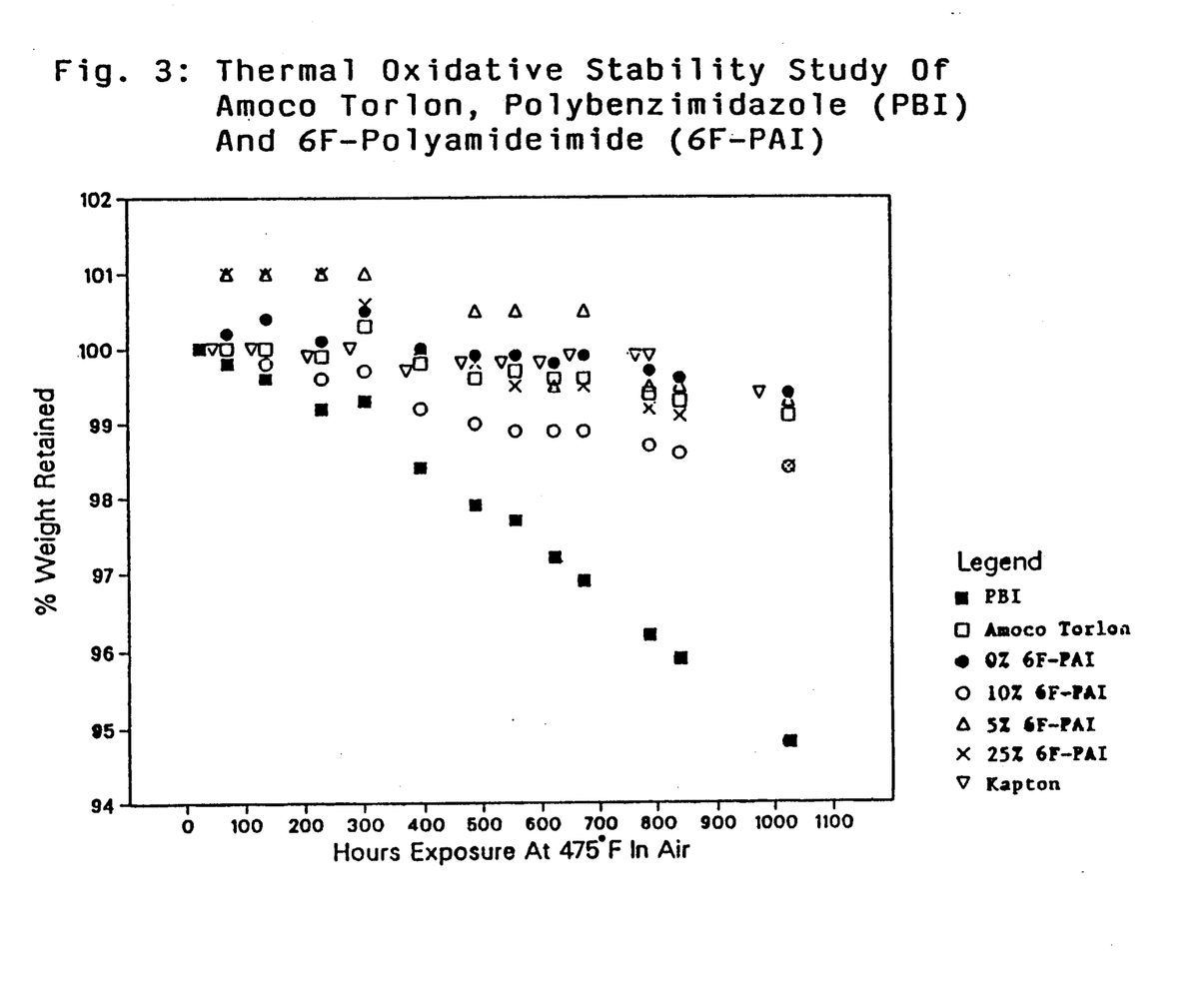
FIG. 3 shows the plots for the thermal oxidative stability for a polybenzimidazole, Amoco ® Torlon ® polyamide-imide, polyamide-imides having fluorine-containing linking groups, and Kapton ® polyimide.
Figure 4:
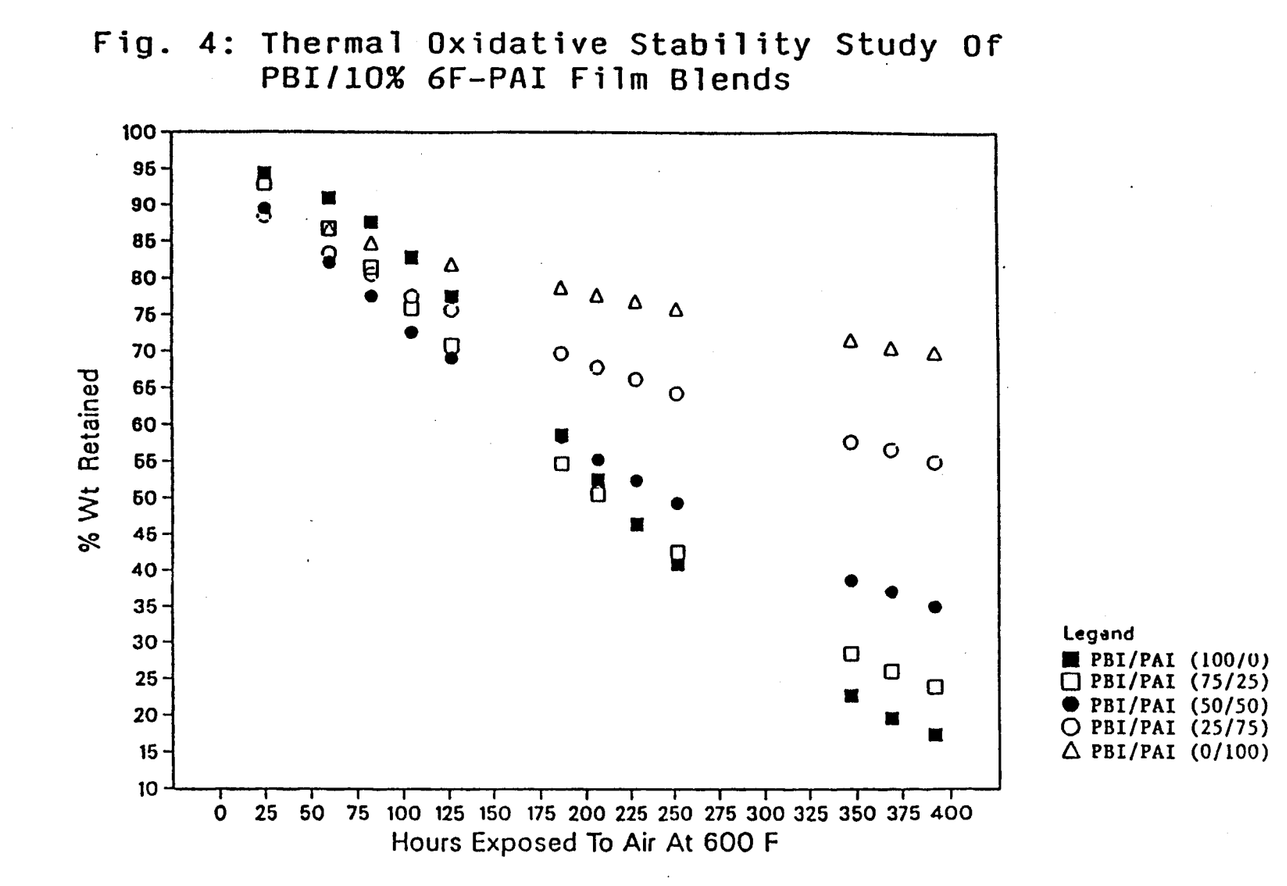
FIG. 4 shows the plots for the thermal oxidative stability for films of blends of a polybenzimidazole and a polyamide-imide having fluorine-containing linking groups as well as the polymers themselves.
Figure 5:
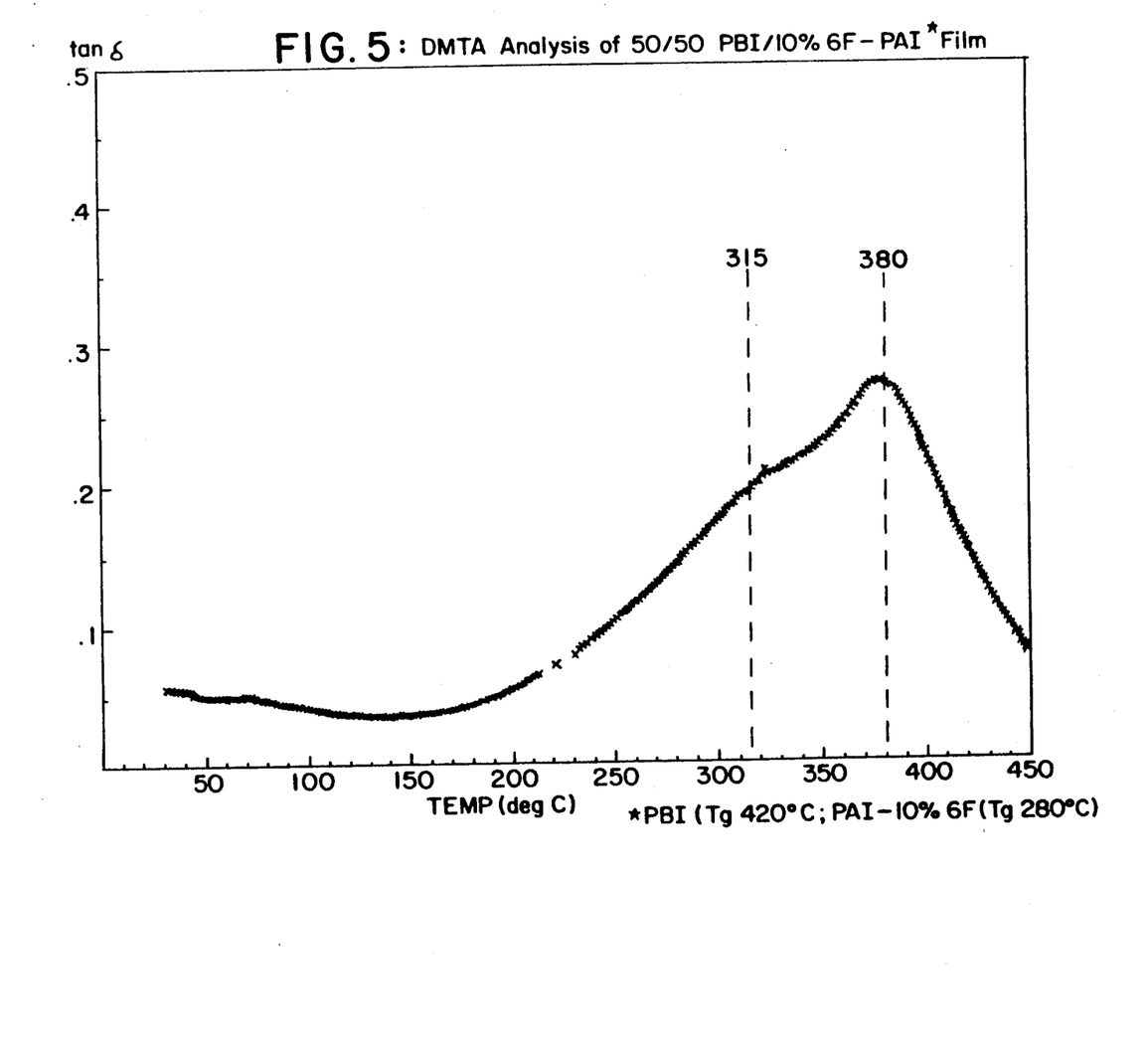
FIG. 5 shows the curve for the DMTA analysis for a 50/50 blend of a polybenzimidazole and a polyamide-imide having fluorine-containing linking groups. The curve evidences the partial miscibility of the blend on the molecular scale.

The compatibility between 10% 6F-PAI and PBI was further demonstrated by observing a synergistic effect on the mechanical properties (e.g., tensile [FIG. 1] and Young's modulus [FIG. 2]) of the films of 10% 6F-PAI and PBI blends.

The blend may be used in any form, e.g., film, fiber, fibret, or molded article. The article may be reinforced, with, e.g., graphite fiber coated with a polyamide-imide having fluorine-containing linking groups to form a "prepreg" tape. Such a prepreg tape may then be coated with a blend of the invention to form a coating of the invention that has better adhesion to other thermoplastic polymers such as polyethylene terephthalate, polybutylene terephthalate and polycarbonates.

Solutions of the blends in organic solvents containing the polyamide-imides having fluorine-containing linking groups in their preimidized form (polyamide-polyamic acid) may be used to produce films, coatings, and the like which may be cured in-situ to convert the polyamic acid to the polyamide-imide by the application of heat.

NMP dopes containing the blends may be added to a non-solvent (e.g., methanol) with constant stirring in order to precipitate the blends. Subsequently, the precipitated blends may be washed several times with aqueous methanol to remove residual solvent if it is present and then vacuum dried at 120° C. for 24 hours. After drying, the solid polymer blends can be compressively molded ($\geq$500 psi, 20 minutes at 350° C.) and homogeneous molded products can be obtained.

Secondly, a solid PBI/PAI (70/30) blend may be prepared by mechanically grinding a mixture of PBI and PAI polymers. A freeze mill device may be used for grinding and the grinding process continued until the diameters of the solid particulates reached 37 $\mu$m or less (about 40 minutes). The fine solid blend has a uniform visual appearance and may be compressively molded ($\geq$500 psi, 30 minutes at 350° C.). The molded product has a dark color, is rigid and exhibits good physical integrity.

After the blends of the invention are precipitated from solution via a non-solvent (e.g., methanol or water), the precipitated blend may then be molded using techniques such as compression molding or injection molding to produce melt fabricated articles such as fibers, films, safety masks, electronic circuit substrates, airplane windows or the like. Shaping may be accomplished by subjecting the blends to temperatures of at least about 300° C. and pressure of about 500 psi. The blends may be compounded with graphite, graphite fiber, molybdenum disulplhide or PTFE for the production of self-lubricating wear surfaces useful for piston rings, valve seats, bearings and seals. They may also be compounded with fibers such as glass, graphite or boron fibers to produce molding compounds for high strength structural components such as jet engine components. The polyamide-imides may also be compounded with friction materials to produce molding compounds for high temperature braking components or with abrasive materials such as diamonds for high speed grinding wheels.

The blends of the invention may be cast as films useful as wire and cable wraps, motor slot liners or flexible printed circuit substrates. They may be used as coatings on substrates such as aluminum or silicon dioxide. They are also useful to produce high temperature coatings for magnetic wire, dip coatings for various electronic components, protective coatings over glass, metal and plastic substrates, wear coatings, and photoresist coatings useful in microelectronic processing.

The blends of the invention may also be used to produce high temperature adhesives for bonding aerospace structures or electrical circuitry, conductive adhesives when mixed with conductive fillers such as silver or gold for microelectronic applications, or adhesives for glass, metal or plastic substrates.

The blends of the invention may also be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

One method that may be used to prepare a blend solution for casting films of the novel blends of the invention comprises first dissolving the blend in a suitable solvent so that the blend is present in the resulting solution at the desired concentration up to a total blend concentration of, e.g., from about 1% to about 25% on a weight/volume basis, preferably from about 15 to 20%. Examples of suitable solvents are N,N-dimethylformamide (DMF), N,N-dimethylacetamide (DMAc), N-methylpyrrolidinone (NMP), or dimethylsulfoxide (DMSO), etc.

The concentration of the solution of the blend to be used in the casting process should be empirically adjusted to yield clear films. For practical purposes, the solution should not be so concentrated that the blend precipitates from it or that it is not readily useful for film casting because it has too high a viscosity. Generally, the total concentration of the blend in the solution is less than about 30 weight percent. Preferably, the total weight of the blend in the solution ranges from about 10 to about 25 weight percent, more preferably from about 10 to about 20 weight percent.

After the film of the blend of the two polymers is formed, the solvent should be evaporated at low relative humidity, e.g., in a vacuum oven at moderate temperatures, e.g., at about $\geq 100°$ C., purged with dry nitrogen. Moisture should be excluded until most of the solvent is removed.

The blends, particularly in the form of films, fibers or fibrets, may be post-treated with heat or a sulfonating agent, e.g., sulfuric acid, in order to minimize their shrinkage when subsequently subjected to heat and in order to increase their resistance to solvents, such as DMAc and NMP, and acids, such as concentrated inorganic acids, e.g., hydrochloric acid. After post-treatment, the articles of the blends are no longer soluble in the solvents used to initially form the blends of the constituent polymers, e.g., DMAc or NMP.

The properties of blends of the present invention can be improved by heat treatment for a sufficient period of time below the heat deflection temperature of the article made from the blend. The blends may be thermally treated in an inert atmosphere (e.g., nitrogen, argon, helium) or alternatively a flowing oxygen-containing atmosphere (e.g., air). For instance, the article may be brought to a temperature approximately 10° C. to 50° C. below the heat deflection temperature of the polyamide-imide having fluorine-containing linking groups, at which temperature the article remains a solid object. The heat treatment times commonly range from a few minutes to a number of hours, e.g., from about 0.1 to about 200 hours, or more. Preferably, the heat treatment is conducted for a time of about 0.5 to about 100 hours.

Heat treatment can provide an increase in the shrinkage and chemical resistance of the blends. The heat deflection temperature is pressure dependent and is a measure of the upper temperature at which articles made from the blends of the invention can be effectively used. Articles made from the blends of the present invention can have heat deflection temperature of at least approximately 200° C.

More particularly, heating in air or in an inert atmosphere at a temperature from about 150° to about 500° C. for a period of time of from about 1 to about 60 minutes may be employed. The time-temperature relationship to obtain the required results can be determined empirically. Preferably, heating at a temperature of from about 200° to about 350° C. may be used. Alternatively, the article may be post-treated by treating with a sulfonating agent followed by heat setting at a temperature of from about 150° to about 400° C. for a period of time sufficient to minimize its shrinkage when subsequently subjected to heat and to increase its resistance to solvents and acids.

A solution of from about 1 to about 15% sulfonating agent followed by heat setting at a temperature of from about 150° to about 400° C. may be used. The sulfonating agent may be sulfuric acid, sulfur trioxide, toluene sulfonic acid or naphthalene sulfonic acid. Preferably, post-treatment is accomplished by dipping the article in 5% sulfuric acid followed by heat setting at a temperature of from about 200° to about 350° C. for a period of time sufficient to minimize its shrinkage when subsequently subjected to heat and to increase its resistance to solvents and acid.

The following examples describe the manner and process of making and using the invention, but are not to be construed as limiting.

In the following examples, the preferred aromatic polybenzimidazole polymer is used, namely, poly-2,2'-(m-phenylene)-5,5'-bibenzimidazole.

EXPERIMENT 1

This example details the preparation of a polyamide-imide having the structure of formula 3 above and based on the reaction product of 0.10 mole of methylene dianiline (MDA), 0.08 moles of 4-trimellitoyl anhydride chloride (4-TMAC) and 0.02 moles of 2,2-bis(3,4-dicarboxyphenyl) hexafluoropropane dianhydride (6F-Dianhydride) to yield a polyamide-imide containing about 20 mole percent 6F-Dianhydride, based on the total acid-/anhydride, monomer content, or about 10 mole percent based on the total acid/anhydride/diamine monomer content of the polymer.

A 1000 ml 4 neck flask, fitted with a stirrer, condenser, Y tube, powder addition funnel, thermometer, dry ice-acetone cooling bath and nitrogen blanket was charged under nitrogen atmosphere with 19.8 grams (0.10 moles) of MDA along with 208.0 grams of reagent grade dimethyl acetamide (DMAc). The mixture was stirred to dissolve the MDA and cooled down to a temperature of about −10° C. The 4-TMAC and 6F-Dianhydride were separately blended in a ratio of 16.84 g of 4-TMAC (0.08 moles) and 8.88 grams of 6F-Dianhydride (0.02 moles) and ½ of this blend (12.86 grams) was gradually added to the solution of MDA in DMAc over a period of about 20 minutes time while continuing agitation and maintaining a temperature of about −5° C. under nitrogen atmosphere. The remainder of the 4-TMAC/6F-Dianhydride blend (12.86 grams) was then gradually added over about 30 minutes time while continuing agitation at about −5° C. under nitrogen atmosphere. The beaker containing the blend was rinsed with 25 grams of additional DMAc, and this was also added to the polymerization solution. The temperature of the solution was allowed to rise to 5° C., and 11.0 grams (0.10 mole) of triethylamine was charged dropwise over about 30 minutes time under nitrogen atmosphere while continuing agitation. Thereafter, 25 grams of DMAc was charged under nitrogen and the reaction mass was agitated at a temperature within the range of 6°-10° C. for three hours. Thereafter, 37.8 grams of pyridine and 54.2 grams of acetic anhydride were charged under nitrogen atmosphere and the reaction mass was then agitated for about 12 hours at room temperature to complete cyclization. The reaction mass was then filtered to remove pyridine hydrochloride.

The polymer formed above was precipitated from solution in methanol by the addition of methanol to the reaction liquor, that is by reverse precipitation, using about 2000 ml of methanol for every 500 grams of polymer solution. The resulting polymer was then washed with water and methanol, and chopped to a fine powder as an aqueous suspension in a mechanical blender. The powder was dried overnight in a vacuum oven at 60° C.

This polymer has the average structural formula:

(ODA). The intrinsic viscosities ranged from 0.4 to 0.6 dl/gm for the former and were approximately 1.4 dl/gm for the latter. This difference was also observed from the GPC-DV analyses wherein the absolute weight average molecular weights (Mw) of the MDA and ODA based PAI polymers were between 15-21M and 60-70M, respectively. In addition, the molecular weight distribution (Mw/Mn) for each synthesized polymer is approximately 2.0; a number which is consistent with the theoretical value (i.e. 2.0) for a linear condensation polymer. In other words, these narrow

EXPERIMENT 2

This experiment sets forth the preparation of a polyamide-imide having the structure of formula 3 above based on the reaction product of 0.25 moles of bis(4-aminophenyl) ether (ODA), 0.2 moles of 4-TMAC and 0.05 moles of 6F-Dianhydride to yield a polyamide-imide polymer containing about 20 mole percent of 6F-Dianhydride based on the total acid/anhydride monomer content, or about 10 mole percent based on the total acid/anhydride/diamine monomer content of the polymer.

The procedure of Experiment 1 was repeated, but the following materials and quantities were employed:

ODA: 50.0 grams
4-TMAC: 41.1 grams
6F-Dianhydride: 22.2 grams
DMAc: 1544.0 grams
Pyridine: 95.0 grams
Triethylamine: 27.5 grams
Acetic anhydride: 140.0 grams Polymerization and sequential additions were conducted as set forth in Experiment 1 except that the amount of DMAc added to the reaction mixture up to the point just after the addition of triethylamine was such as to yield a 10% by weight polymerization solution. 400 grams of the total 1544 grams of DMAc was then added prior to the 3 hour polymerization step. The polymer was recovered as set forth in Experiment 1, yielding 96.5 grams of bright yellow fluffy solids.

The degree of polymerization of all synthesized samples were determined by measuring the IV values of each polymer. The measurements were typically performed in 0.5 wt. % DMAc (N,N-Dimethyl acetamide) solutions at 25° C. via a glass viscometer. The AMW and MWD (molecular weight distribution) of each polymer were determined with the use of Vescotek's gel permeation chromatography-differential viscometer (GPC-DV) instrument.

Four micro-styragel columns (1M, 10M, 100M & 1MM Å) were used for the chromatographic separations and N-methyl-2-pyrrolidone (NMP) containing 0.2% lithium bromide was used as the GPC-DV mobile phase.

The IV results suggested that the PAI polymers synthesized with the use of methylene dianiline (MDA) as the diamine monomer had a lower degree of polymerization (DP) then those synthesized from oxydianiline molecular weight distributions suggested the newly synthesized 6F-polyamideimides were linear in solution with a negligible amount of crosslinkage.

The glass transition temperatures (Tg) of the 6F-PAI polymers were determined by differential scanning calorimetry using a Perkin Elmer calorimeter (DSC-4) operating at 20° C./m. with a nitrogen atmosphere flowing at 60 cc/min. The 6F-PAI polymers have Tg values equivalent to or higher than a commercially available polyamideimide (Tg=275° C.). The improvement in Tg has apparently resulted from the incorporation of 6F moieties into the polymer backbone.

Thermogravimetric analysis (TGA) was performed with a Perkin Elmer 65-2 analyzer at 20° C./min. with an air flow rate of 80 cc/min. These studies indicated that the temperature corresponding to five percent weight loss for each of the synthesized samples was above 500° C.

EXAMPLE 1

Celanese polybenzimidazole having an inherent viscosity of 0.4 (6 gm) or greater was mixed with 50 mls of N-methylpyrrolidinone at 180° C. for 120 minutes. Then the resulting mixture was filtered through glass wool. The filtrate containing about 12% polybenzimidazole was used as a solvent to dissolve 1.5 gm of the polyamide-imide having fluorine-containing linking groups of the formula given in Experiment 1 at a temperature of 120° C. for 30 minutes. The solution contained about 12% polybenzimidazole and 3% polyamide-imide having fluorine-containing linking groups (PAIF) in N-methylpyrrolidinone (NMP). The solution was kept at 80° C. overnight. The solution was found clear (no precipitate). The solids content of the solution was about 15%. A clear yellow film was cast from solution on a glass plate. The casting was repeated. Visual and microscopic observation indicated that the thin film was clear.

EXAMPLE 2

Dissolution techniques were developed to assess the compatibility and processability of blends containing polybenzimidazole and polyamide-imide having fluorine-containing linking groups. Using N-methylpyrrolidinone, dopes containing high levels (≧20%, wt./vol.%) of solids with the following polybenzimidazole/polyamide-imide compositions ratios were prepared: 100/0, 75/25, 50/50, 25/75 and 0/100. These drops were homogeneous and had no insolubles. Also, the stability of these dopes increased with the increase of the relative concentration of polyamide-imide. Clear films were successfully cast by using the above polybenzimidazole/polyamide-imide blends.

For the sake of simplicity, as-spun Celanese polybenzimidazole was used for the dissolving studies, and the NMP solvent contained no salt, such as LiCl, for stability. The PAI was synthesized as described in Experiment 1. The dissolving was accomplished by weighing and drying (100° C., 20 min.) 20 gm samples of each polymer composition, then adding each sample to a separate refluxing flask containing 100 mls of NMP. The NMP was kept at 100° C., and the whole sample (20 gm) was added in 2 gm portions over a period of 1 hour. After complete addition, the five solutions were heated at 100° C. under constant stirring for another 10 minutes before cooling to room temperature.

No insolubles could be visually observed in any of these six solutions during the first 12 hours. After aging at room temperature for 1 day, the solution containing 100% Polybenzimidazole and 75/25 polybenzimidazole/PAI formed brown precipitates which could be readily dissolved upon heating. The other solutions were more stable and the dope stability, based on haze level, appeared to increase with the increase of the relative PAI concentration. In a separate film casting trial, clear films could be cast from all of the above PAI/polybenzimidazole dopes.

Those results suggested not only that high levels (≧20% solids) of PAI and polybenzimidazole could be co-dissolved into NMP, but also that molecular interaction might exist between PAI and Polybenzimidazole, causing a synergistic effect on properties.

Film samples from the six solutions were cast on a glass plate. Each fresh, wet film was dried for 20 minutes in a laboratory vacuum oven set at 140° C., then cooled to room temperature for 20 minutes, and finally soaked in a water bath for 20 minutes. The samples were evaluated for mechanical properties. The samples appear to have mechanical properties which exceed the rule of mixtures for both the tenacity and the modulus.

The results of the experiments conducted are tabulated in the following Tables:

Table 1 described the development of a cosolvent for preparing stable and processable dopes containing PBI and PAI.

Table 2 shows the results of the compatibility studies of the PBI/PAI blends.

Table 3 describes the physical property improvements obtained by blending PBI with PAI.

TABLE 1

| Cosolvent (NMP) Development | | | | | |
|---|---|---|---|---|---|
| | PBI/PAI Ratio (wt./wt.) | | | | |
| | 100/0 | 75/25 | 50/50 | 25/75 | 0/100 |
| Dope homogeneity | Yes | Yes | Yes | Yes | Yes |
| Dope Stability | 1 | 1 | 3 | 5 | >14 |

TABLE 1-continued

| Cosolvent (NMP) Development | | | | | |
|---|---|---|---|---|---|
| | PBI/PAI Ratio (wt./wt.) | | | | |
| | 100/0 | 75/25 | 50/50 | 25/75 | 0/100 |
| (days) | | | | | |

Note:
(1) PBI (as-spun fiber) having <1 PPM residual LiCl and <0.3% residual DMAc was used for preparing all dopes.
(2) The solids content of all dopes was 20% (wt %) and no LiCl was added.
(3) All dopes were prepared by heating the polymer in NMP at 100° C. for one hour.
(4) PAI is MDA based 10% 6F-PAI (synthesized as described in Experiment 1 above.)
(5) Dope homogeneity and stability were based on visual measurements of the haze level and insolubles.

TABLE 2

| Compatibility Studies of the PBI/PAI Blends | | | | | |
|---|---|---|---|---|---|
| | PBI/PAI ratio | | | | |
| | 100/0 | 75/25 | 50/50 | 25/75 | 0/100 |
| Cast film | Clear | Clear | Clear | Clear | Clear |

Note:
(1) 2 mil films were prepared by drying the wet film (cast on a glass plate) in a laboratory vacuum oven at 140° C. for 20 minutes.

TABLE 3

| Tenacity and Modulus of PBI/PAI Films | | |
|---|---|---|
| PBI/PAI (wt./wt.) | Tenacity (ksi) | Modulus (msi) |
| 100/0 | 15.0 | 0.464 |
| 75/25 | 14.7 | 0.441 |
| 50/50 | 15.0 | 0.414 |
| 25/75 | 12.0 | 0.374 |
| 0/100 | 11.3 | 0.310 |

Note:
1. 10% 6F-PAI from Experiment 1 above.
2. PBI (As spun fiber)
3. All data are the average of three individual analyses.

Based on the relative PBI concentration, the PBI/PAI film blends exhibited excellent or improved resistance towards chlorinated hydrocarbons, but they are still soluble in polar solvents, such as NMP and DMAc. Those film samples also shrunk at an elevated temperature (e.g., >200° C.). Two post-treatment methods, thermal or sulfonation agent treatments, were developed for enhancing the solvent (NMP) stability and thermal shrinkage properties of the compatible PBI/PAI blends. Initial results on an 75/25: PBI/PAI film indicated the sample treated with either method (e.g., thermal treating at 380° C. for 20 minutes or 5% sulfuric acid dipping followed with 6 minutes 380° C. heat-setting) not only exhibited good physical integrity, but also showed improved solvent stability in NMP (100° C., 30 minutes) and concentrated sulfuric acid (25° C., 48 hours), a substantial improvement over the untreated films. Independent thermal analysis indicated these post-treatments would dramatically improve the thermal shrinkage properties of the original blend The compatibility between 6F-PAI and PBI was first noticed from the solubility study. Either 10 or 25% 6F-PAI polymer formed visually homogeneous DMAc solutions with PBI at all ratios. These solution blends at a 15% solid concentrations were stable at room temperature for at least 12 hours.

In order to further assess the blend properties, film blends of 6F-PAI and PBI were prepared by first casting the solution blends on a glass plate and subsequently drying the cast film in a vacuum oven set at 140° C. for 20 minutes. Transparent film blends with composition across the whole range were obtained from the 10% 6F-PAI and PBI. However, the corresponding film blends obtained from 25% 6F-PAI and PBI were somewhat brittle. The results suggest that the compatibility between 10% 6F-PAI and PBI is higher than the corresponding compatibility between the 25% 6F-PAI and PBI.

EXAMPLE 3

The procedure of Example 1 is repeated, but the PAIF has the formula (6) above wherein $Ar^3$ is the divalent moiety from methylene dianiline, $Ar^5$ is the divalent moiety (7), a is 0.8 and b is 0.2. The results suggest compatibility between the PBI and PAIF.

EXAMPLE 4

The procedure of Example 1 is repeated, but the PAIF has the formula (11) above wherein $Ar^3$ is the divalent moiety from methylene dianiline, $Ar^4$ is the tetravalent moiety (4), a is 0.9 and b is 0.1. The results suggest compatibility between the PBI and PAIF.

What is claimed is:

1. A blend comprising from about 5 to about 95 weight percent of a polybenzimidazole and from about 95 to about 5 weight percent of a polyamide-imide having fluorine-containing linking groups, total weight percent of the two component polymers in the blend equaling 100.

2. A polymer blend as claimed in claim 1 in which the polybenzimidazole contains units of the formula:

(1)

wherein represents a tetravalent aromatic moiety having the formula:

or

, wherein $R^1$ is —O—, —SO$_2$—, —CH=CH—, —C(CF$_3$)$_2$— or (—CH$_2$—)$_x$ and x is an integer of from 1 to 4; and —Ar$^2$— represents a divalent aromatic moiety having the formula:

or

, wherein $R^2$ is —O—, —SO$_2$—, —CH=CH—, —C(CF$_3$)$_2$— or (—CH$_2$—)$_x$ and x is an integer of from 1 to 4.

3. A polymer blend as claimed in claim 1 in which the polyamide-imide having fluorine-containing linking groups contains units of the formula:

(3)

wherein $Ar^3$ is a divalent aromatic moiety; $Ar^4$ is a tetravalent aromatic moiety containing the ring substituted or ring unsubstituted residuum selected from:

(4)

or (5)

and a and b, each having an independent value of from about 0.05 to about 0.95, represent the mole fraction of each recurring unit in the polymer chain, with the proviso that the sum of a and b is equal to 1.00, n is a number sufficient to give rise to an inherent viscosity of at least about 0.1 for the polyamide-imide having fluorine-containing linking groups as measured at 25° C. from a 0.5 weight percent solution of that polymer in dimethyl acetamide.

4. A polymer blend as claimed in claim 1 in which the polybenzimidazole contains units of the formula:

(1)

wherein represents a tetravalent aromatic moiety having the formula:

or wherein R$^1$ is —O—, —SO$_2$—, —CH=CH—, —C(CF$_3$)$_2$— or (—CH$_2$—)$_x$ and x is an integer of from 1 to 4; and —Ar$^2$— represents a divalent aromatic moiety having the formula:

or wherein R$^2$ is —O—, —SO$_2$—, —CH=CH—, —C(CF$_3$)$_2$— or (—CH$_2$—)$_x$ and x is an integer of from 1 to 4, and a polyamide-imide having fluorine-containing linking groups having the unit formula:

(3)

wherein Ar$^3$ is a divalent aromatic moiety; Ar$^4$ is a tetravalent aromatic moiety containing the ring substituted or ring unsubstituted residuum selected from:

(4)

or (5)

and a and b, each having an independent value of from about 0.05 to about 0.95, represent the mole fraction of each recurring unit in the polymer chain, with the proviso that the sum of a and b is equal to 1.00, n is a number sufficient to give rise to an inherent viscosity of at least about 0.1 for the polyamide-imide having fluorine-containing linking groups as measured at 25° C. from a 0.5 weight percent solution of that polymer in dimethyl acetamide.

5. A blend as claimed in claim 1 in which the aromatic polybenzimidazole is poly-2,2'-(m-phenylene)-5,5'-bibenzimidazole.

6. A blend as claimed in claim 3 in which Ar$^3$ in formula 3 is the divalent residuum of one or a combination of aromatic diamines having the formula:

NH$_2$—R$^3$—NH$_2$ (12)

wherein R$^3$ is the aromatic moiety of a phenylene, naphthalene, or polyphenylene compound.

7. A blend as claimed in claim 3 in which Ar$^3$ in formula 3 is the divalent residuum of one or a combination of aromatic diamines having the formula:

NH$_2$—R$^3$—NH$_2$ (12)

wherein R$^3$ is selected from:

wherein R⁴ is a divalent moiety independently selected from a covalent carbon to carbon bond, methylene, ethylene, propylene, isopropylene, hexafluoroisopropylidene, 1-phenyl-2,2,2-trifluoroethylidene, dichloro and difluoroalkylenes up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene having up to 8 Si atoms, disiloxanylene, and a polysiloxanylene having up to 8 Si atoms.

8. A blend as claimed in claim 1 in which the polyamide-imide having fluorine-containing linking groups is prepared by the polycondensation polymerization of a mixture of monoacid anhydride, dianhydride, and diamino monomers, at least one of said monomers being a fluorinated monomer selected from the group consisting of:
2,2-bis(3,4-dicarboxyphenyl) hexafluoropropane dianhydride;
1,3-bis(3,4-dicarboxyphenyl) hexafluoropropane dianhydride;
1,1-bis(3,4-dicarboxyphenyl)-1-phenyl-2,2,2-trifluoroethane dianhydride;
2,2-bis[4-3(3,4-dicarboxyphenoxy) phenyl] hexafluoropropane dianhydride;
1,1-bis[4-(3,4-dicarboxyphenyl) phenyl]-1-phenyl-2,2,2-trifluoroethane dianhydride;
4,4-bis[2-(3,4-dicarboxyphenyl) hexafluoroisopropyl] diphenyl ether dianhydride;
2,2-bis(3-aminophenyl) hexafluoropropane;
2,2-bis(4-aminophenyl) hexafluoropropane;
2-(3-aminophenyl)-2-(4-aminophenyl) hexafluoropropane; and the -1-phenyl-2,2,2-trifluoroethane homologs of such amino monomers.

9. The blend of claim 8 wherein said monoacid anhydride monomer is 4-trimellitoyl anhydride chloride.

10. The blend of claim 8 wherein said fluorine containing monomer is 2,2-bis(3,4-dicarboxy-phenyl) hexafluoropropane dianhydride.

11. The blend of claim 8 wherein said diamino monomer is a diaryl diamine having the formula:

wherein R⁴ is a divalent moiety independently selected from a covalent carbon to carbon bond, methylene, ethylene, propylene, isopropylene, hexafluoroisopropylidene, 1-phenyl-2,2,2-trifluoroethylidene, dichloro and difluoroalkylenes up to 3 carbons, oxy, thio, sulfinyl, sulfonyl, sulfonamido, carbonyl, oxydicarbonyl, oxydimethylene, sulfonyldioxy, carbonyldioxy, polysilanylene having up to 8 Si atoms; and a polysiloxanylene having up to 8 Si atoms.

12. The blend of claim 11 wherein R⁴ is methylene.

13. The blend of claim 8 containing from about 1 to about 100 mole percent of fluorine-containing monomers.

14. The blend of claim 13 containing from about 2 to about 50 mole percent of fluorine-containing monomers.

15. A blend as claimed in claim 1 in which the polyamide-imide having fluorine-containing linking groups has the formula:

wherein a has a value from about 0.5 to about 0.9 and b has a value from about 0.5 to about 0.1.

16. A blend as claimed in claim 1 in which the polybenzimidazole is present in the blend in an amount sufficient to make the polyamide-imide having fluorine-containing linking groups more thermally and chemically resistant with better mechanical properties.

17. A blend as claimed in claim 1 in which the blend comprises from about 5 weight percent to about 95 weight percent of a polybenzimidazole and from about 95 weight percent to about 5 weight percent of a polyamide-imide having fluorine-containing linking groups.

18. A blend as claimed in claim 1 in which the blend comprises at least about 20 weight percent of a polybenzimidazole.

19. A blend as claimed in claim 1 in which a polyamide-imide having fluorine-containing linking groups is present in the blend in an amount sufficient to make the polybenzimidazole less moisture sensitive with a higher thermal oxidative stability.

20. A blend as claimed in claim 1 in which there is also present approximately 1 to about 30 percent, by weight, based upon the total weight of the blend, of a solid filler, reinforcing agent, or mixtures thereof.

21. A process for preparing the blends of claim 1 which comprises dissolving in a mutual solvent from about 5 to about 95 weight percent of the aromatic polybenzimidazole and from about 95 to about 5 weight percent of the polyamide-imide having fluorine-containing linking groups, based on the total weight of those polymers and subsequently evaporating the solvent, thereby producing a dried blend of the polybenzimidazole and the polyamide-imide having fluorine-containing linking groups.

22. A process as claimed in claim 21 in which the mutual solvent is N,N-dimethylformamide, N,N-dimethylacetamide, N-methylpyrrolidinone, or dimethylsulfoxide.

23. The blend of claim 1 in the form of a compression molded article or in the form of a film, fiber or fibret.

* * * * *